Figure 1:
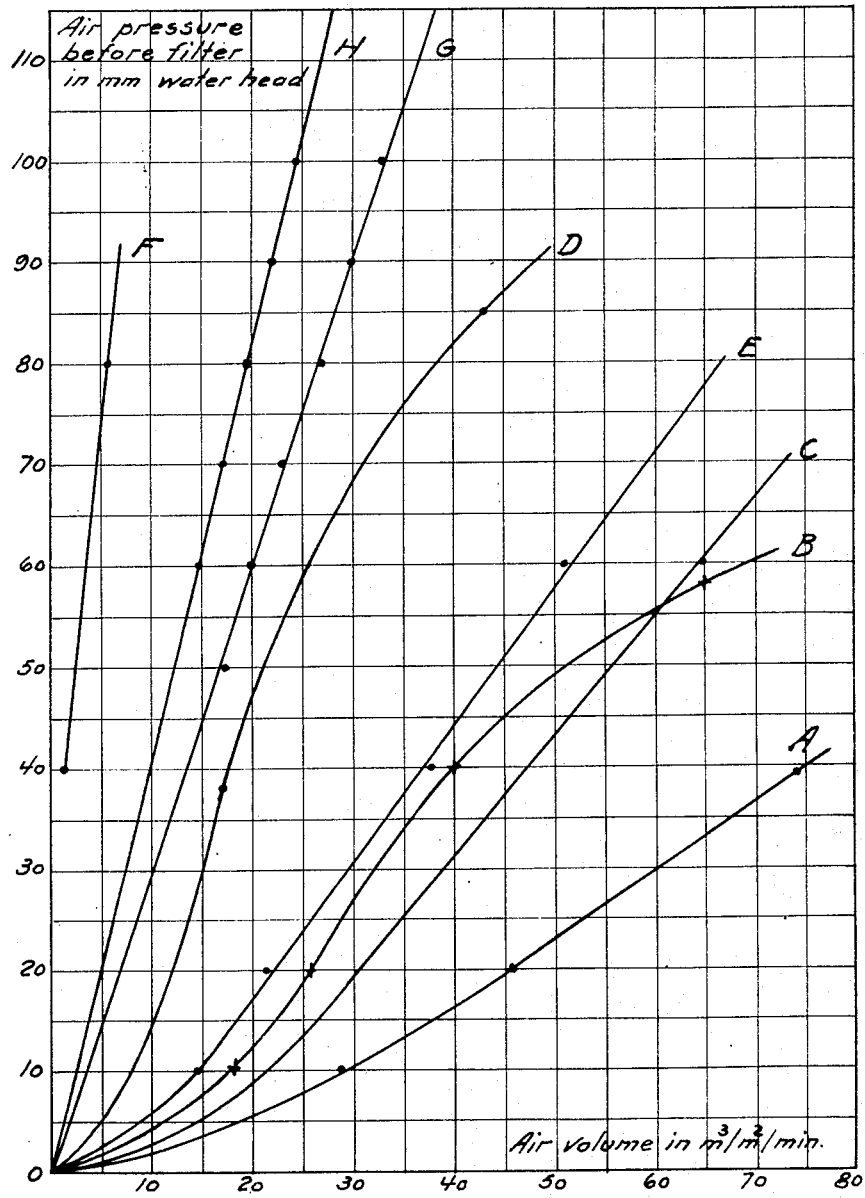

FILTER SHEET OF ASPLUND-TYPE FIBERS

Patented Jan. 5, 1954

2,664,964

UNITED STATES PATENT OFFICE 2,664,964

FIBROUS FILTER SHEET FOR GASES

Arne Johan Arthur Asplund, Stockholm, Sweden

Application July 16, 1947, Serial No. 761,190

3 Claims. (Cl. 183—44)

The present invention relates to a fibrous filter sheet for removing entrained solid and liquid particles from air and other gases. The filter can advantageously be used for industrial and home air conditioning plants, for air filters for motor vehicles, gasoline motors, diesel engines etc., for gas filters for generator gas, especially for motor vehicles, and in general for removing dust particles from air and gases where temperature conditions allow the use of filter media made from vegetable fibres.

To demonstrate the characteristics of the filter according to the present invention the use thereof for the filtering of gas from carbon monoxide gas generators for motor vehicles will be described as an example of the usefulness thereof.

In gas generators of the types commonly used for the production of carbon monoxide gas from charcoal and other coked fuels, the gas is generally filtered through cotton cloth in order to remove injurious dust particles.

A motor with a cylinder volume of about 3 liters consuming 1.5-2 cubic meters of gas per minute, requires a filter area of 1.5-2 square meters. The active area of the filter is chosen with respect to the quantity of dust which according to experience is collected on the filter cloth after a certain length of operation time. It is obvious that sooner or later the filter has to be cleansed or exchanged and therefore the filter area is chosen so that with a normal fuel this cleansing operation does not have to be repeated too often. As normal is considered that the periods between the removal of the dust should allow for 200–400 miles driving distance, depending on the dust content and character of the charcoal fuel.

Almost all generator gas systems using charcoal as fuel are also equipped with a secondary gas filter of small filtering area to collect small dust particles, which might pass through the first filter cloth or through the holes or leaks, which frequently develop in the cloth filter. This extra filter, which may be termed the secondary or safety filter, is commonly made of fine meshed metal wire cloth which, however, allows finer dust particles to pass through. This presents, of course, one advantage, as such filter will not need frequent cleansing, but on the other hand the particles passing through add to the wear of the motor and the contamination of the crank-case oil. On account of its effective filtering properties and low specific resistance the filter according to the present invention is well suited to be used as such secondary or safety filter for generator gas.

On generator gas driven vehicles there is, when the motor is not running, a danger of gas coming from the generator backwards through the intake of secondary air. It is therefore often required that the secondary air intake should be placed outside the motor-hood so as to prevent gas accumulating inside the car. When the air intake is placed outside the car, the secondary air may carry with it large quantities of dust particles, which, when introduced into the motor cylinders, may cause serious damage to the cylinder walls and pistons. It is therefore considered advisable to let the secondary air pass through a filter in order to remove dust particles from the air before it is mixed with the generator gas. Since the filter according to the present invention separates out dust particles of smaller size than ordinary filters, and also is less sensitive to moisture, rain etc., it is more advantageous than the types hereto used, although it may have a somewhat higher resistance to the air passing through it.

In some cases the safety filter is placed behind the gas-air-mixer. In such cases the air and the gas might be filtered together, but then there is a greater possibility of clogging the secondary filter as water and tar may be separated out on account of the cooling effect of the secondary air on the gas. The insensibility to moisture of the filter according to the present invention is in such cases of a great advantage.

In gas generators using wood or other hydrogen containing fuels the purification of the gas presents somewhat different problems. Such generator gas will contain a considerable amount of water vapor, which causes difficulties through condensation if ordinary filter cloth is used. The gas is therefore generally cleansed by passing through a water seal. This is made possible as a sufficient quantity of water vapor is always formed in the combustion of wood as well as through the evaporation of the moisture content of the fuel itself. Such a water seal has in general a poor cleansing effect and a filter according to the present invention can therefore advantageously be used on account of its good filtering properties even when moist or wet.

Although, under ideal conditions, the gas coming from a charcoal gas generator only contains dry dust, it may under less favorable conditions also contain other matter, such as water vapor and entrained tar particles. When the gas cools down the water vapor condenses to a mist, which is caught partially in the primary filter but also by the safety filter. The filters then become wet, which may cause a serious lowering of the porosity, thus increasing the resistance to the passing gas. The tar has a similar effect.

When using a cloth filter the resistance caused by the absorbed water may be overcome by drying the filter cloth, but the increased resistance caused by the entrained tar particles is a more serious disadvantage, as it can not be remedied by drying the filter cloth. The wetting of the filter cloth generally occurs when the gas generator is started, especially in cold weather, and when the moisture content of the charcoal is high. When the generator has been run a sufficient length of time the filter cloth may have become sufficiently dried by the passing gas, so as to cause the resistance to decrease to a point where enough gas can pass through to allow the motor to start. On the other hand, the tar is not evaporated in the same manner, for which reason a tar filled filter cloth must be replaced.

The new fibrous filter, according to my present invention, is especially well adapted for gas generators, as its resistance to the passing gas when wet does not increase at the same rate as the woven filter cloth now used for gas generators.

Having now described different uses of the filter according to the present invention I will proceed to describe how the filter may be made to suit the different forms of application.

As raw material for the fibrous pulp used for my filter I prefer wood from coniferous trees, for instance the wood from spruce or pine, as such wood has relatively large fibres and yields a "free" pulp, the expression "free" taken in the same sense that it has in the paper pulp industry in regard to the behavior of fibre masses. The wood from deciduous trees has in general smaller fibres and consequently a less "free" filter sheet will be produced. As it is important that the fibres of the wood should be separated from each other without undue injury to the fibre walls themselves and with the natural resilience of the fibres preserved, I prefer to use the defibration method described in my U. S. Patent No. 2,008,892. By this method the wood is mechanically defibrated while heated to a temperature well above the boiling point of water, preferably at a temperature of or around 180° C. where the cementing substance between the fibres is softened or melted. The fibres can under these conditions be separated from each other with the least possible injury to the fibre walls.

The fibrous pulp thus obtained is then mixed with water and subjected to a size classification operation to remove the coarse fibre bundles and preferably also the undersize fibres and fragments. This is most advantageously done by passing the fibre suspension through screens commonly used for fibre pulp in paper manufacture.

To remove the coarse particles screens with round holes of 2-3 mm. diameter or slits of 0.3-1.0 mm. in width may be used. The classification effect is of course also dependent upon the amount of water used in the operation, a procedure which is familiar to those skilled in the art of paper making.

After having thus separated the coarse fibre bundles from the pulp this may be further treated for removal of the undersize particles. This may conveniently be accomplished by passing the pulp over a very fine screening surface, which allows the finer particles to pass and retains the full size fibres and coarser particles.

By undersized particles in this connection is meant such particles which are produced in the process of defibrating the original lignocellulose material, and which are considerably smaller than the fibrous particles obtained. The undersized particles may form in the process by cutting of longer fibres of the original material or consist of very small sized particles of the plant substance, for instance, such cellular materials which are of such size that they are not suitable for papermaking purposes. Such undersized particles might for ordinary paper making purposes be useful as filler and as adhesive material between the longer fibres, and thus add to the felting properties of the fibre pulp. If, on the other hand, these undersized particles are present to any larger amount in the filter sheet according to the invention they might unduly close the filter sheet, for which reason it may be desirable in certain cases to remove them. These particles may vary in size from a few thousands of a mm. up to 50μ (0.05 mm.) or thereabout. The undersized particles might of course be removed by a screening operation, where the size of the openings of the screen should be of such magnitude that the desirable fibrous particles are retained and the undersized particles pass through the screen. Where such particles are not present in any large amount they will after an ordinary screening operation have become removed with the water added for the screening operation. This will for instance happen if the pulp thickener is equipped with a wire cloth with a mesh of about 40–60 meshes per inch. In such a case the openings between the wires have a magnitude of from $\frac{1}{10}-\frac{2}{10}$ of a mm. or thereabout, depending upon the size of the wires, these openings being more or less of the same size in both dimensions and not elongated as is the case with slots in a screen.

After having thus separated from the original fibrous pulp the oversize particles and in case of need also the undersize particles, a fibre suspension remains containing the bulk of the tracheoid fibres of the original wood. This pulp may then be used without further treatment or may be treated with a slight grinding operation, depending upon the special characteristics which it may be desirable to impart to the fibrous filter sheet.

Thus, if it is desirable to produce a filter sheet of extreme porosity, the fibre pulp may be formed into sheets without further processing. For this operation a hand sheet forming box may be used or the fibrous pulp suspension may be run onto a paper machine of suitable construction. When the pulp is "free" the last mentioned procedure may present certain difficulties, as in the wet sheet the fibres will only loosely adhere together.

The wet fibre sheet is pressed to remove the excess of water and then dried in some suitable manner. To secure maximum porosity the wet fibre sheet is preferably dried by means of heated air or gases circulated around the sheet or passed through the filter sheet which by this method may be dried very quickly. The steam-heated drying cylinders commonly used for drying the wet fibre sheet in paper machines should preferably be avoided as they tend to make the surface thereof less porous especially if drying temperatures above 110°-120° C. are used. In such cases temperatures below 110° C., preferably 90°-100° C., should be used. A weight of 200 to 1000 grams per square meter calculated on the absolute dry basis of the fibres is suitable to produce a good filter sheet.

The fibre filter sheets thus produced have an extremely low resistance to the passage of gases and are therefore suitable for use where a filter of high porosity and having only a small filter area is required. This filter must, however, be inserted in such a way, that its lack of mechanical stability is counteracted by suitable reinforcements. It may thus, when used for this purpose, suitably be placed between two supporting wire screens, perforated plates or similar supporting members.

When it is desirable to produce a fibre filter with higher mechanical stability according to the present invention, e. g. when the lowest possible resistance to gas passage is of main importance, the fibre pulp may be subjected to a certain amount of beating, e. g. in a hollander beater, to impart to the fibres an increased amount of felting power. In doing so, I have found it desirable to avoid metal beating tackles, as these have a more or less pronounced cutting action on the fibres, thus producing an undue amount of undersize fibre fragments. I have thus found it desirable to use mineral beating tackle for instance basalt lava stones. The beating of the fibre pulp must not be carried too far, as the resistance of the finished fibre filter sheet to the gas may then increase to a point, where the finished fibre sheet can not suitably be used as a gas filter.

As it is impossible to express the effect of beating on the gas resistance of the finished fibre filter sheet in numerical values, it may be sufficient to state that the effect of the beating may be easily studied by making sheets from the fibre pulp obtained as the beating process proceeds and determine the effect of the beating on gas-resistance and strength characteristics of the fibre filter sheets. The beating process should of course not be carried further than until the minimum requirement of strength of the sheet is reached or the most desirable balance between the two qualities in question is attained.

According to the present invention the fibrous filter sheet may also if necessary be subjected to an impregnating treatment with a binder to strengthen the sheet and to impart to the sheet certain desirable surface properties.

As impregnating substances may be used adhesives or binders such as water soluble inorganic salts, such as sodium and potassium silicate dissolved in water, colloidal glue suspensions in water, such as casein and cellulose glycolate glues, or organic substances dissolved in solvents such as cellulose acetate, asphalt or similar substances dissolved in some suitable organic solvent. The impregnating solution or suspension may be applied to the filter sheet when wet or after it has been dried, according to the nature of the impregnating medium. It may also be added to the fibre pulp before it is formed to a wet sheet.

In general the best results are obtained when the impregnating is carried out on the dried fibre sheet.

When the solvent evaporates the impregnating substances leave a coating on the fibres, strengthening the bonds between them. The surface of thus treated fibre filter sheets becomes firmer which is advantageous when accumulated dust particles are to be removed from the filter by brushing or cleansing with an air stream.

The impregnating solution must be applied in restricted quantities, as, when the solvent is removed by evaporation, the pores between the fibres otherwise may be clogged by remaining films of the impregnating substance. The regulating of the quantity of the impregnating substance to be applied does not represent any problem, as the margin between the desired bonding effect between the fibres and when the pores are being clogged is fairly wide.

When the fibre filter sheets according to the present invention are used for the filtering of dust-laden gas or air, the filtering area must be chosen with respect to the quantity of dust accumulated on the filtering surface. Obviously the resistance of the filter increases with the thickness and character of the dust layer. The resistance of the filter to the passage of gas will successively increase to a point where the dust layer has to be removed or the filter exchanged. If the filter can be easily and cheaply exchanged, it is permissible to reckon with shorter periods, than if the filter is expensive and more difficult to exchange. As the fibre filter sheet according to the invention is less expensive than e. g. cotton filter cloth and since the fibre filter sheets can be easily exchanged, it is permissible with filter sheets according to the present invention to use a smaller filtering surface.

One of the most important properties of the fibre sheet according to the present invention is that it can absorb a considerable quantity of moisture and still retain a sufficient low resistance to the passage of gas. It is in this respect far superior to the commonly used cotton cloth fabrics.

To show the characteristic properties of the fibrous filter sheets according to the present invention the following results of laboratory tests on filter sheets may be cited.

The filter sheets were inserted in an air duct where a flow of air was induced by a centrifugal fan. By means of a throttle between the fan and the filter the air pressure was regulated to give different air pressures on the entrance side of the filter. The air pressure was measured in millimeter water head by means of a U-gauge. The volume of air passing through the filter was measured after having passed the filter.

The results obtained in these tests are shown in the accompanying drawing in which Fig. 1 is a plot comparing my filter with filters made of various other filtering materials, the air pressures being plotted as ordinates and the air volume passing through the filters as abscissas.

Figure 2:
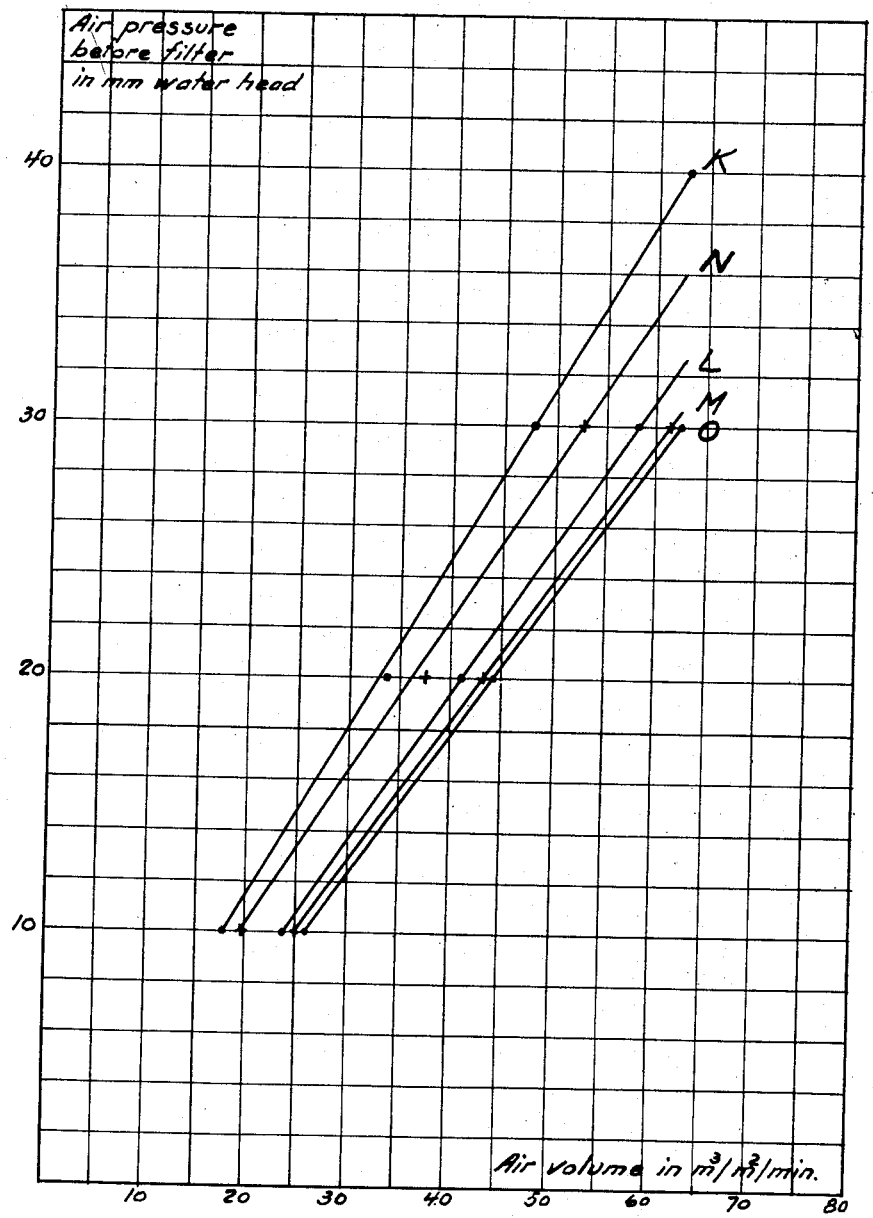
Figure 3:
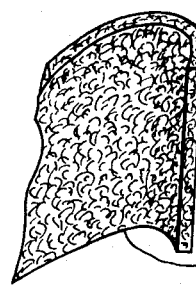

Fig. 2 is a plot comparing one of my unimpregnated filters with filters impregnated with various binding materials, while Fig. 3 is a perspective view of one of my filter sheets.

The results of the comparative tests are represented by the curves in Fig. 1 showing the amount of air measured in cubic meters of air at atmospheric pressure per square metre of filter area per minute passing through the filter at different air pressures measured in mm. water head before the filter.

Curve A shows the results with a dry filter weighing 210 grams per square metre produced according to the present invention.

Curve B shows the results with the same filter as A, but wetted. The moisture content of the filter was at the beginning of the test 1.6 parts by weight of water per part of dry material and at the end of the test 1 part of water per part of dry material. The resistance of the filter sheet decreased during the test. The curve therefore deviated appreciably from the straight line.

Curve C shows the results with a crepped multiple cellulose filter weighing 100 grams per square metre.

Curve D shows the results with the same filter as C but wetted to the same moisture as the filter A.

Curve E shows the results with an ordinary dry cotton filter cloth with a weight of 220 grams per square metre.

Curve F shows the results with the same filter as E but with the cloth moistened with water. The moisture content was before the test 0.75 part by weight of water per part of dry material and after the test 0.65 part of water per part of dry material. The curve shows that the air resistance of the moist filter cloth has increased approximately ten times.

Curve G shows the results of a one sheet filter made from unbeaten sulphite cellulose pulp with a weight of 150 grams per square metre.

Curve H shows the results of a one sheet filter made from unbeaten sulphate cellulose pulp with a weight of 160 grams per square metre.

The curves in the diagram Fig. 2 show the results of a set of comparative tests with dry unimpregnated and impregnated filter sheets according to the present invention.

Curve K shows the results with an unimpregnated filter weighing 284 grams per square metre.

Curve L shows the results with a similar filter as K but weighing 214 grams per square metre.

Curve M shows the results with a filter impregnated with waterglass. The dry weight of fibre was 212 grams per square metre and of the impregnating medium 110 grams per square metre. The final weight of the filter sheet was thus 322 grams per square metre.

Curve N shows the results with a filter impregnated with casein glue. The dry weight of the filter was 218 grams per square metre and of the impregnating medium 67 gram per square metre. The final weight of the filter sheet was thus 285 grams per square metre.

Curve O shows the result with a filter impregnated with a solution of cellulose acetate. The dry weight of the filter was 214 grams per square metre and that of the cellulose acetate 167 grams per square metre. The final weight of the filter sheet was thus 381 grams per square metre.

The amount of impregnating medium used in the tests represented by the curves in Fig. 2 was far in excess of what could be considered necessary to impart to the filter sheets the desired qualities, but were used to clearly demonstrate the remarkable fact that the resistance to the passage of air through the filter does not show any appreciable changes after the impregnation of the filter sheets, which may be attributed to the fact that the impregnating medium largely by capillary force is contracted to the crossing points of the fibres forming the filter sheet, thus leaving the minute openings between free and thereby not restricting the air passages.

The amount of impregnating media used may vary from a much smaller amount than used in the above described test sheets, say from 10 to 50 percent, up to such amounts where the minute openings between the fibres will begin to be clogged to such an extent that the porosity of the filter sheet will tend to become unduly impaired.

I claim:

1. A highly porous filter sheet particularly adapted for the mechanical separation of dust particles from gases, said sheet being formed from a pulp of Asplund-type fibers comprising the bulk of the aracheoid fibers of natural wood having substantially the natural resilience and structure of the original fibers, said fibers being formed into a sheet from an aqueous suspension thereof with the fibers arranged crosswise without predominant fiber direction, the sheet being free from coarse fiber bundles and from particles having a length below about 0.05 mm., the sheet having a weight of from about 200 to 1000 g. per square meter on the dry basis; said sheet having a remarkably low resistance to the passage of gases.

2. The filter sheet of claim 1 impregnated with from about 10 to 50 per cent by weight of a binding substance.

3. The filter sheet of claim 1 wherein the fibres are derived from coniferous trees.

ARNE JOHAN ARTHUR ASPLUND.

References Cited in the file of this patent

UNITED STATES PATENTS

| Number | Name | Date |
| --- | --- | --- |
| 671,548 | Gordon | Apr. 9, 1901 |
| 737,557 | Friswell | Aug. 25, 1903 |
| 1,574,896 | Johnson | Mar. 2, 1926 |
| 1,799,949 | Boughton | Apr. 7, 1931 |
| 1,856,114 | Richter et al. | May 3, 1932 |
| 1,899,106 | Richter et al. | Feb. 28, 1933 |
| 1,955,892 | Schur | Apr. 24, 1934 |
| 2,008,892 | Asplund | July 23, 1935 |
| 2,019,241 | Weiss | Oct. 29, 1935 |
| 2,045,676 | Quinlivan | June 30, 1936 |
| 2,054,890 | Stampe | Sept. 22, 1936 |
| 2,285,490 | Broderick | June 9, 1942 |
| 2,325,302 | Britt | July 27, 1943 |
| 2,437,082 | Davis et al. | Mar. 2, 1948 |

FOREIGN PATENTS

| Number | Country | Date |
| --- | --- | --- |
| 12,149 | Australia | Apr. 19, 1934 |
| 80,445 | Austria | Apr. 10, 1920 |
| 518,568 | Great Britain | Mar. 1, 1940 |

OTHER REFERENCES

Dictionary of Paper, published by American Paper and Pulp Association, New York (1940), page 159.

III International Conference on Timber Utilization, Paris 26–28, July 1937, No. 16–17 Special No., pp. 90, 93, 94, 95, 96. (Copy National Lumber Manufacture Assn., 92AD Washington, D. C.)